W. E. TAYLOR.
METALLIC JOINT.
APPLICATION FILED AUG. 30, 1918.
1,303,740.
Patented May 13, 1919.
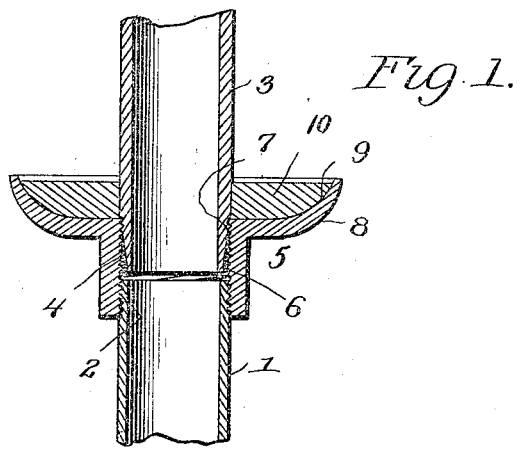
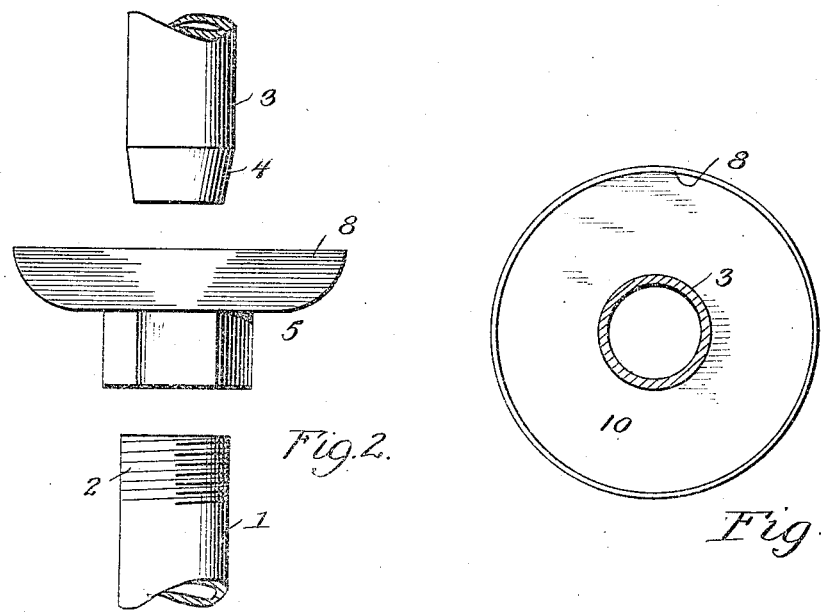
INVENTOR
W. E. Taylor
Victor J. Evans
attorney

UNITED STATES PATENT OFFICE.

WALTER ELMER TAYLOR, OF AVALON, PENNSYLVANIA.

METALLIC JOINT.

1,303,740. Specification of Letters Patent. Patented May 13, 1919.

Application filed August 30, 1918. Serial No. 252,050.

*To all whom it may concern:*

Be it known that I, WALTER ELMER TAYLOR, a citizen of the United States, residing at Avalon, in the county of Allegheny and State of Pennsylvania, have invented new and useful Improvements in Metallic Joints, of which the following is a specification.

This invention relates to a joint and has for its primary object to provide a joint whereby pipe sections may be connected together in a liquid tight manner.

An object of the invention is to provide a joint that may readily connect a lead pipe to an iron pipe without the necessity of flanging the lead pipe which is the usual practice.

Another object of the invention is to provide a joint capable of diminishing the time required for connecting a lead pipe to an iron pipe.

With these and other objects in view the invention will be better understood from the following detailed description taken in connection with the accompanying drawing wherein:

Figure 1 is a vertical sectional view of my invention.

Fig. 2 is a side elevation of the part separated.

Fig. 3 is a horizontal sectional view.

In the drawing which illustrates one form that my invention may assume, the numeral 1 designates an ordinary iron pipe with screw threads 2. The numeral 3 designates a lead pipe that has its extremity tapered as indicated at 4 for the purpose hereinafter described. The joint or union 5 is provided with interiorly arranged threads 6 engaging the threads 2 with certain of the threads forced into engagement with the tapering extremity 4 as indicated at 7 so as to properly associate the iron pipe 1 with the lead pipe 3 during the operation now to be described.

The joint 5 includes a dish shaped flange 8 encircling the pipe section 3 to form a depression 9 for the reception of solder 10 or other sealing material.

From the foregoing description it will be seen that in a very simple manner solder may be poured into the recess 9 and allowed to solidify without the necessity of attention. It will also be noted that the flange 8 is arranged in a manner that the solder will gravitate into contact with the surface of the pipe section 3 so as to accomplish a liquid tight joint. By my construction it will be seen that the time consumed in making the joint is materially reduced over the present practice where the lead pipe 3 must be acted upon to flange the same so as to be sealed to the iron pipe 1. Another important advantage of my invention is that the gravitational action of the melted solder will cause the same to run in a direction to absolutely insure a liquid tight joint. It is of course to be understood that the invention may be constructed in various other manners than shown and therefore I do not desire to be limited in any manner except as set forth in the claim hereunto appended.

Having described my invention, what I claim is:

A joint member having screw threads to engage an iron pipe and the tapering end of a lead pipe and constructed to have a dish shaped portion to receive a sealing material after the member has connected the pipes together.

In testimony whereof I affix my signature.

WALTER ELMER TAYLOR.

Copies of this patent may be obtained for five cents each, by addressing the "Commissioner of Patents, Washington, D. C."